Sept. 12, 1933.　　　　A. Y. DODGE　　　　1,926,374

BRAKE

Filed May 22, 1930

INVENTOR.
ADIEL Y. DODGE
BY
ATTORNEY

Patented Sept. 12, 1933

1,926,374

UNITED STATES PATENT OFFICE 1,926,374

BRAKE

Adiel Y. Dodge, South Bend, Ind., assignor to Bendix Brake Company, South Bend, Ind., a corporation of Illinois Application May 22, 1930. Serial No. 454,586

6 Claims. (Cl. 188—78)

This invention relates to brakes and more particularly to internal expanding brakes.

An object of the invention is to provide a brake in which the inherent tendency to click is reduced to a minimum.

Another object of the invention is to provide a brake having a novel manner of applying the shoes.

Another object of the invention is to provide a brake having a single means for applying the shoes and returning them to the "off" position.

A further object of the invention is to provide a duplex adjustment for the shoes.

Yet a further object of the invention is to provide an adjustment for the shoes which may be made from the outside of the brake mechanism.

Yet a further object of the invention is to provide a brake of the character designated, in which the amount of the required machine operation of the parts during manufacture may be materially reduced.

Still a further object of the invention is to provide a brake of the character described, which will be simple and inexpensive in structure, highly efficient in use, positive in action, durable in service and of a general improvement in the art.

Other objects of the invention will appear from the following description taken in connection with the drawing, which form a part of this specification, and in which.

Figure 1:
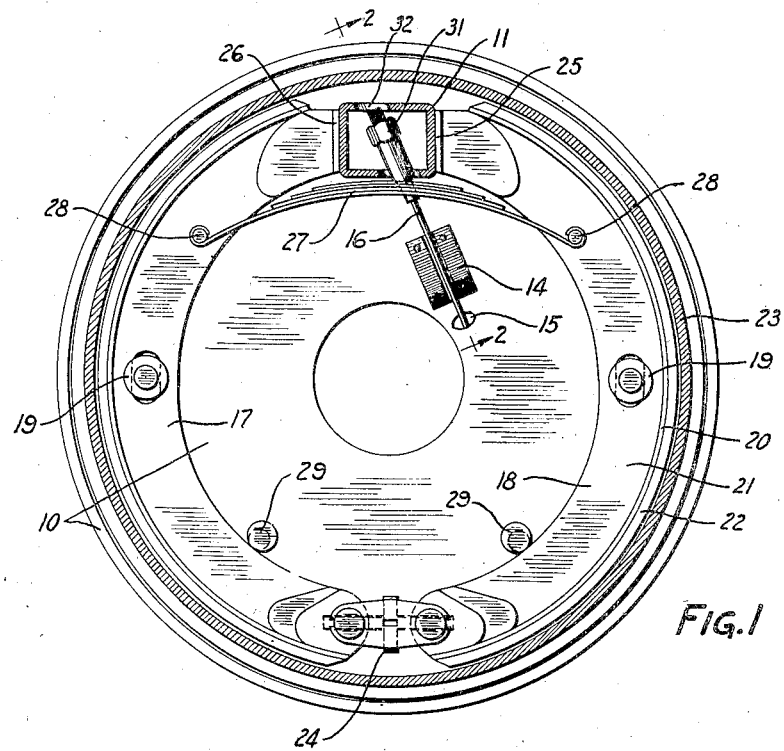
Figure 1 is a side elevation of a brake embodying the invention.
Figure 2:
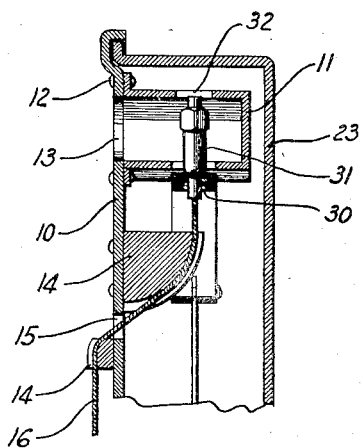
Figure 2 is an enlarged sectional view substantially on the line 2—2 of Figure 1.

Referring to the drawing for more specific details of the invention, 10 represents a conventional backing plate having positioned thereon an anchor 11. As shown, the anchor is a hollow stamping secured to the backing plate as by rivets 12 and opening to the outside, as indicated at 13, the object of which will hereinafter appear. The backing plate also has secured thereto suitable guide members 14 arranged on the respective sides of the plate adjacent an opening 15. These guide members are grooved to receive an operating cable 16 hereinafter referred to.

Brake shoes 17 and 18 are mounted on the backing plate 10 on suitable steady rests 19. These brake shoes are of a conventional type. They have a rim 20, a web 21 and the usual brake lining 22 secured to the rim and adapted to engaged a drum 23 which may be suitably secured to a wheel, not shown. The shoes are secured together at their articulating ends by an adjustment screw 24 and are provided on their opposite ends with shoulders 25 and 26 which normally engage the anchor.

Positioned beneath the anchor is a laminated leaf spring 27 having its respective ends secured to the webs 21 on the shoes as by suitable studs 28. This spring serves to return and retain the shoes in the "off" position. As shown, the spring retains the shoulders 25 and 26 on the respective shoes against the anchor 11 and displacement is prevented by suitable stops 29 positioned on the backing plate. These stops engage the webs 21 and prevent slipping of the shoulders 25 and 26 on the anchor 11.

The spring 27 has a bore 30 in which is fitted a nut 31 threaded on the operating cable 16. The nut 31 is elongated to extend through an opening 32 into the hollow anchor 11, so that the tension on the operating cable may be easily adjusted and equalization obtained from the outside. This spring also functions as a toggle to engage the shoes with the drum, when a pull or tension is applied to the cable 16.

In operation, a pull on the cable will slide the shoes into engagement with the drum at the articulating end thereof prior to spreading them away from the anchor. Thus, tendency to click is nil or negligible. When the articulating ends of the shoes engage the drum, the spring under further pull or tension applied through the operating cable functions as a toggle to spread the shoes away from the anchor. This spring also serves to return and retain the shoes in "off" position when tension on the cable is released. As the shoes engage the drum, the rotation thereof slightly rotates the shoes so that a shoulder 25 on the shoe 18 engages the anchor.

While a preferred embodiment of the invention has been described, it is to be understood that this is given merely as an example of the underlying principles of the invention and since this may be incorporated in other specific structures, I do not intend to be limited to that shown except as such limitations are clearly imposed by the appended claims.

Having thus described the various features of the invention, what I claim as new and desire to secure by Letters Patent is:

1. A brake comprising a backing plate, shoes movable thereon, a hollow anchor for the shoes, a leaf spring connecting the shoes and means in the hollow anchor for regulating the spring.

2. A brake comprising a backing plate, a plurality of shoes movable thereon, a laminated leaf spring connecting the shoes and a cable attached to the spring for imposing pressure thereon.

3. A brake comprising a backing plate, a hollow abutment positioned thereon opening to the outside of the plate, a lengthwise-movable operating member extending transversely of and into the hollow abutment, and means positioned on the operating member within the hollow abutment for adjusting the brake.

4. A brake comprising a backing plate, a hollow abutment on the plate opening to the back of the plate, shoes on the plate, a leaf spring connecting the shoes and means associated with the spring made adjustable within the hollow abutment for regulating pressure on the spring to apply the shoes and to return them to "off" position.

5. A brake comprising a backing plate, a hollow abutment on the plate opening through the plate, shoes on the plate, a member connecting the shoes, a lengthwise-movable operating member associated with the member connecting the shoes and means on the operating member positioned within the hollow abutment for adjusting the brake.

6. A brake comprising a backing plate, a hollow abutment on the plate opening through the plate, shoes on the plate, a member connecting the shoes, a lengthwise-movable operating member and means connecting the operating member with the member connecting the shoes having a portion extending into the hollow abutment and accessible for adjustment from outside of the plate.

ADIEL Y. DODGE.